United States Patent [19]

Takefuta

[11] Patent Number: 4,645,045
[45] Date of Patent: Feb. 24, 1987

[54] AUTOMATIC TRANSMISSION SYSTEM FOR VEHICLES

[75] Inventor: Hideyasu Takefuta, Higashimatsuyama, Japan

[73] Assignee: Diesel Kiki Co., Ltd., Japan

[21] Appl. No.: 703,291

[22] Filed: Feb. 20, 1985

[30] Foreign Application Priority Data

Feb. 20, 1984 [JP] Japan .................... 59-28772

[51] Int. Cl.$^4$ .................... B60K 41/22; B60K 41/28
[52] U.S. Cl. .................... 192/3.62; 74/866; 364/424.1
[58] Field of Search .................... 192/3.54, 3.55, 3.62, 192/0.092; 74/866; 364/424.1

[56] References Cited

U.S. PATENT DOCUMENTS 4,324,153  4/1982  Sugimoto et al. .................... 74/866
4,495,576  1/1985  Ito .................... 74/866 X
4,523,281  6/1985  Noda et al. .................... 74/866 X

FOREIGN PATENT DOCUMENTS 58-124853  7/1983  Japan .

*Primary Examiner*—Rodney H. Bonck
*Attorney, Agent, or Firm*—Guy W. Shoup

[57] ABSTRACT

A vehicle automatic transmission system including a speed-change-gear type transmission has a signal generator which has an selecting lever movable along a predetermined gear shift pattern used for manual operation and generates a command signal showing the position of the selecting lever on the gear shift pattern and a controller responsive to the command signal to automatically perform an automatic gear change operation of the speed-change-gear type transmission, whereby the driver can carry out the commanding operation for gear change with the same feeling as in manual operation of a conventional speed-change-gear box.

7 Claims, 5 Drawing Figures

AUTOMATIC TRANSMISSION SYSTEM FOR VEHICLES

BACKGROUND OF THE INVENTION

The present invention relates to an automatic transmission system for vehicles, and more particularly to a vehicle automatic transmission system of the speed-change-gear type having actuators responsive to electric signals provided in association with the transmission and clutch for automatically carrying out start and gear change operations with reference to predetermined gear-change map data in accordance with parameters indicative of the operating condition of the vehicle, such as the amount of depression of the accelerator pedal.

In such a type of automatic transmission system, insofar as the derived conditions for gear change are satisfied, the gear change operation will be carried out in accordance with predetermined gear change map data independently of the will of the driver. However, under certain conditions it may sometimes be desirable to carry out the gear change operation not on the basis of the gear change map data but on the basis of the will of the driver.

To make this possible, there has, for example, been proposed an automatic transmission system provided with a manual switch for commanding gear change and a manual pattern showing the allowable range for manual operation of gear change. When the switch is operated in the case where the manual operation is in the allowable range, the operation of changing to a higher or lower gear is carried out in response to the operation of the switch, and after this, the gear change operation is automatically returned to the gearshift control based on the automatic gear change pattern (Japanese Patent Application Disclosure Sho No. 58-124853).

However, the proposed system needs a number of switches, such as a shift-up switch, a shift-down switch, a hold switch and the like, so that it has the disadvantages of making driving complicated and is not compatible with the desire to reduce fuel consumption while enhancing operational ease.

SUMMARY OF THE INVENTION

It is therefore an object of the present invention to provide an improved speed-change-gear type automatic transmission system for vehicles which is free from the above drawbacks.

It is another object of the present invention to provide a speed-change-gear type automatic transmission system for vehicles in which automatic gear change operation reflecting the will of the driver can be realized merely by the operation of the shift lever and the accelerator pedal, whereby the operation of the vehicle is remarkably improved.

The automatic transmission system for vehicles according to the present invention has a friction clutch and a speed-change-gear type transmission which are coupled with an internal combustion engine, means for producing at least one data indicative of the condition of operation of the vehicle, actuators for actuating the clutch and the transmission and a control means responsive to at least said data for controlling the operation of the actuators in order to carry out the gear change operation of the transmission, and is characterized in that the control means has a storing means for storing first data representing a first gear change map showing gear change characteristics for obtaining economical running and second data representing a second gear change map showing gear change characteristics for obtaining high-power-output running, a signal generating means which has an operation lever movable along a predetermined gear shift pattern used for manual operation and generates a command signal indicative of the position of the operation lever on the gear shift pattern, means responsive to the command signal and the data for controlling the actuators so as to carry out one operation among a first control operation in which the transmission is shifted to the gear position corresponding to the position of the operation lever, a second control operation in which the transmission is automatically shifted in accordance with the first gear change map and a third control operation in which the transmission is automatically shifted in accordance with the second gear change map.

The signal generating means is constituted so as to have the same appearance as the conventional gear changer, so that the driver can carry out the commanding operation for gear change with the same feeling as in manual operation of a conventional speed-change-gear box. Furthermore, as the automatic transmission according to the invention does not require any switch or the like, it is easy to operate.

As a result, the will of the driver can be easily reflected in the operation of the vehicle, reducing driver fatigue and increasing driving safety.

The present invention will be better understood and the other objects and advantages thereof will be more apparent from the following detailed description of preferred embodiments with reference to the accompanying drawings.

DESCRIPTION OF THE PREFERRED EMBODIMENTS

Figure 1:
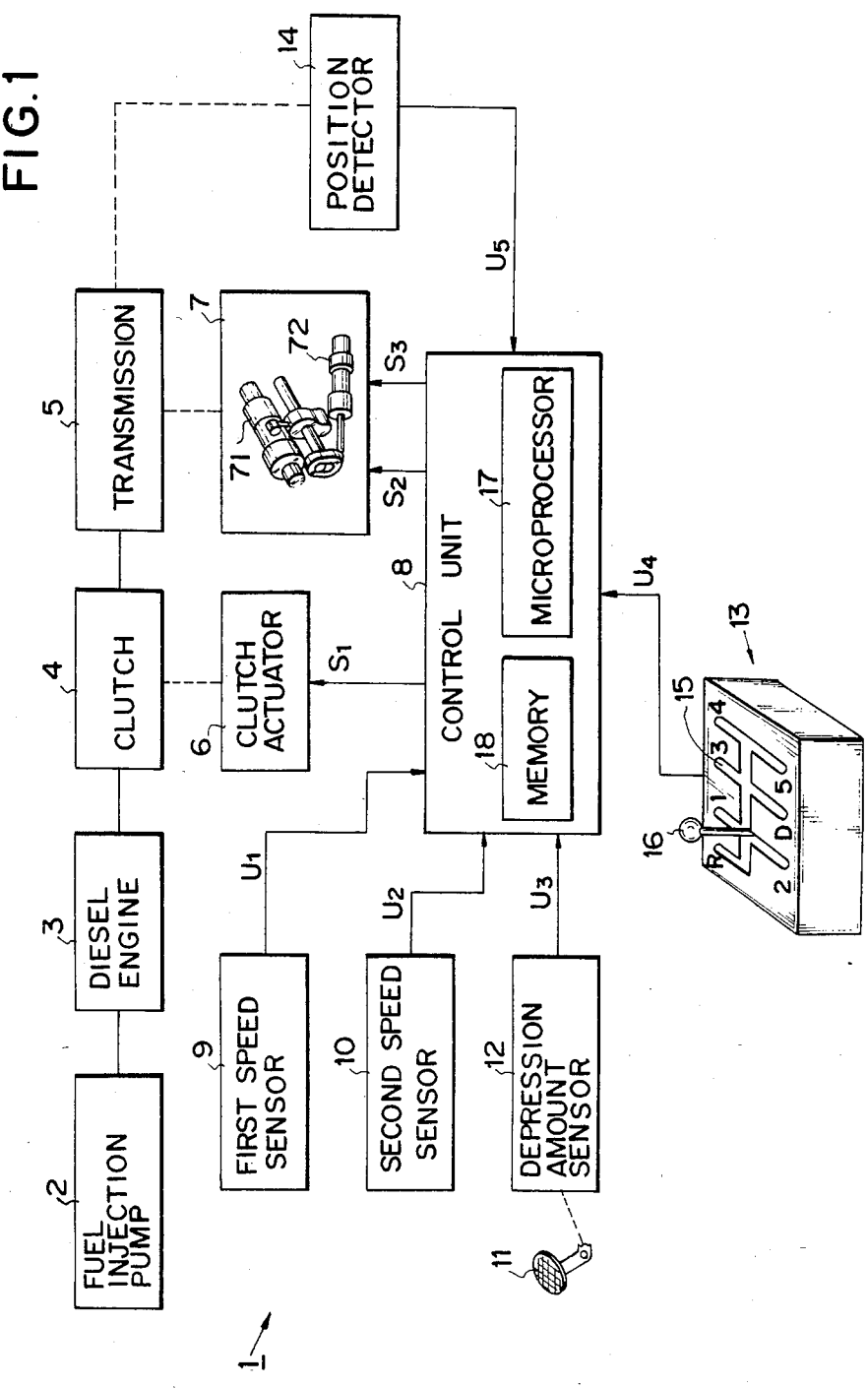
FIG. 1 is a block diagram showing an embodiment of a vehicle automatic transmission system according to the present invention.

Now, a detailed description of an embodiment of the automatic transmission system for vehicles according to the present invention will be made with reference to FIG. 1. The automatic transmission system 1 comprises a clutch 4 coupled to a diesel engine 3 having a fuel injection pump 2 and a speed change-gear type transmission 5 coupled to the clutch 4. A clutch actuator 6 and a transmission actuator 7 are connected to the clutch 4 and the transmission 5, respectively. The clutch actuator 6 is controlled by a first control signal S1 and the transmission actuator 7 is controlled by second and third control signals S2 and S3 from a control unit 8.

The automatic transmission system 1 further comprises a first speed sensor 9 for producing a first speed signal U1 indicative of the speed N of the diesel engine 3, a second speed sensor 10 for producing a second speed signal U2 indicative of speed V of the vehicle (not shown), a depression amount sensor 12 which detects the amount of depression of an accelerator pedal 11 and produces an accelerator signal U3 indicative of the amount of depression of the accelerator pedal 11, a command signal generator 13 for generating a command signal U4 for commanding the gear change mode of the transmission 5, and a position detector 14 for producing a position signal U5 indicative of the gear position in the transmission 5 at each instant.

As shown in FIG. 1, the command signal generator 13 has an operation lever 16 movable along a shift pattern slit (or groove) 15 of the same configuration as that of a conventional manual gear change device and the appearance of the command signal generator 13 is the same as that of a conventional manual gear change device. The operation lever 16 of the command signal generator 13 can be positioned at the desired position among a plurality of shift positions indicated by the characters "R", "I", "2", "3", "D", "4" and "5". The command signal generator 13 produces a signal indicative of the position of the operation level 16 as the position signal U4.

The control unit 8 includes a microprocessor 17 and a memory 18 which stores first gear change map data representing gear change characteristics for carrying out gear change operation to obtain economical running in response to signals showing predetermined conditions of engine operation and second gear change map data representing gear change characteristics for carrying out gear change operation to obtain high-power-output running in response to signals showing predetermined conditions of engine operation.

Figure 2:
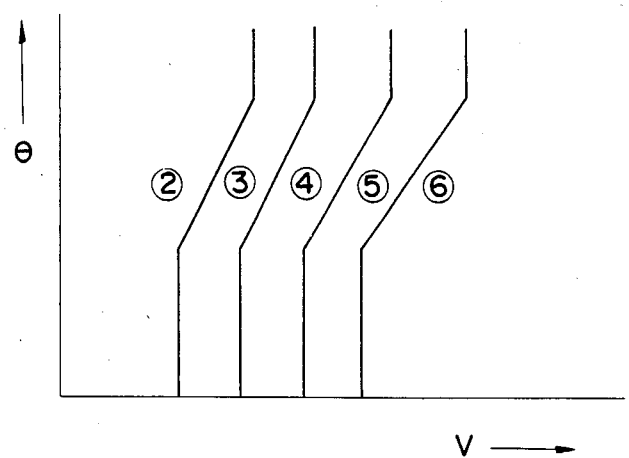
FIGS. 2 and 3 are characteristic curves showing gear change characteristics.
Figure 3:
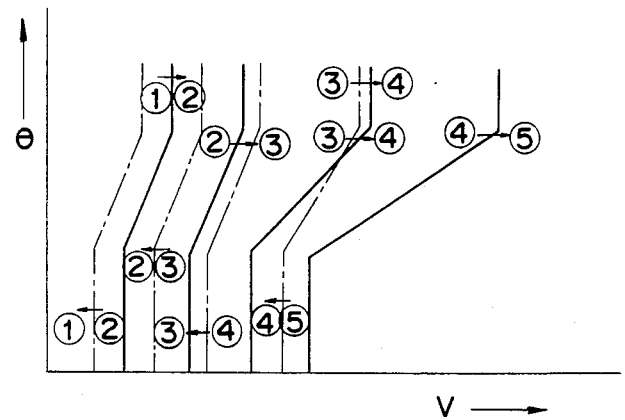

FIGS. 2 and 3 show gear change characteristic curves determined by the first and second gear change map data, with the vehicle speed V represented on the X-axis and the amount $\theta$ of depression of the accelerator pedal 11 represented on the Y-axis.

To the control unit 8 there are applied the first speed signal U1, the second speed signal U2, the accelerator signal U3, the command signal U4, and the position signal U5, and predetermined control calculations are executed by the microprocessor 17 in the control unit 8 on the basis of these signals with reference to the first or second gear change map data stored in the memory 18.

The control calculation is carried out in accordance with a control program stored in the memory 18 as follows:

When it is discriminated from the command signal U4 that the operation lever 16 is positioned at the position "D", a calculation for determining the optimum gear change position at that time is carried out with reference to the first gear change map data on the basis of the vehicle speed V and the amount $\theta$ of depression of the accelerator pedal 11.

After this, the first, second and third control signals are generated by the control unit 8 so as to shift the transmission 5 to the calculated optimum gear position.

As shown in FIG. 1, the transmission actuator 7 has a select actuator 71 responsive to the second control signal S2 for actuating the transmission 5 in the select direction and a shift actuator 72 responsive to the third signal S3 for actuating the transmission 5 in the shift direction. As a result, the transmission actuator 7 is capable of shifting the transmission 5 to any gear position in cooperation with the clutch actuator responsive to the first control signal S1.

The structures of the clutch actuator 6 and the transmission actuator 7 are known and a detailed explanation thereof will be omitted.

When the operation lever 16 is positioned at any of positions "3", "4" or "5", the gear change operation according to the second gear change map data (corresponding to the characteristic curves shown in FIG. 3) is carried out. As will be understood from a comparison of the characteristic curves shown in FIGS. 2 and 3, in the second gear change map, shift-up is carried out at higher vehicle speed in order to operate the engine at higher output power. The gear change operation based on the second gear change map data is carried out only when the operation lever 16 is positioned at one of the positions "3", "4" or "5", and the gear positions among these to which the transmission 5 can be shifted are limited to positions not higher than that corresponding to the position of the operation lever 16. Namely, for example, when the operation lever 16 is at the position "4", the positions to which the transmission 5 can be shifted range from positions "1" to "4". In other words, in this operation mode, the highest gear position is that corresponding to the position of the operation lever 16 at that time.

In the gear change operation based on the second gear change map data, at the time just after the gear position is changed, the characteristic curves are changed as shown by the chain lines in FIG. 3, so as to have a hysteresis characteristic, whereby stable operation in gear changing can be attained.

When the operation lever 16 is positioned at one of the positioned "R", "1" or "2", the transmission 5 is shifted to the gear position corresponding to that of the operation lever 16 regardless of the first and second gear change map data.

Figure 4:
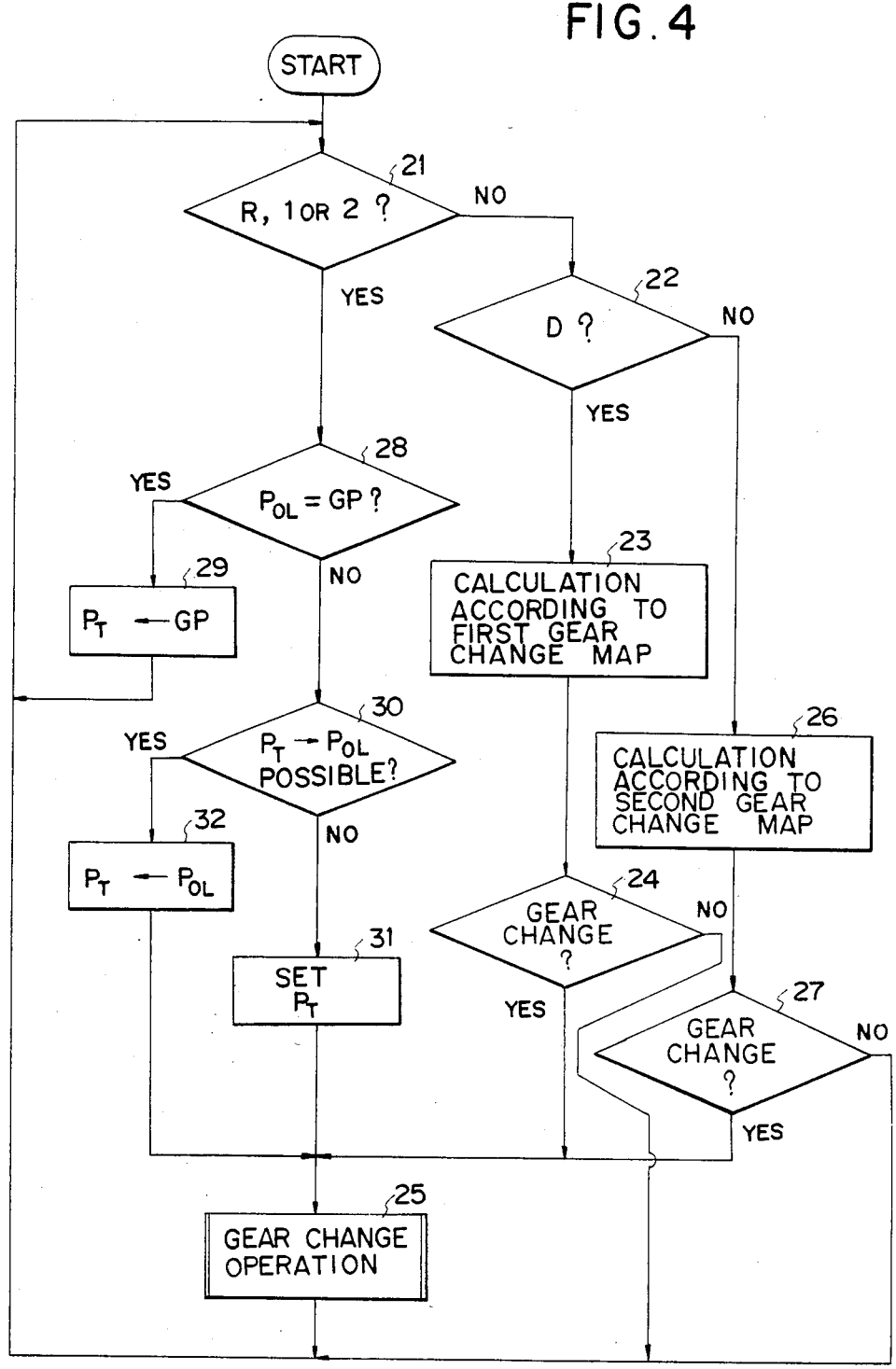
FIG. 4 is a flow chart representing a control program executed in the control unit of FIG. 1.

FIG. 4 shows a flow chart of the control program for performing the control operation described above. The description will now be made with reference to this flow chart.

After the start of the program, discrimination is made in step 21 as to whether the position $P_{OL}$ of the operation lever 16 is at "R", "1" or "2". When the result of the discrimination in step 21 is NO, namely, the position $P_{OL}$ is at "3", "4", "5" or "D", the operation moves to step 22, where the discrimination is made as to whether the position $P_{OL}$ is at "D". When the result of the discrimination in step 22 is YES, the operation moves to step 23, where a calculation for gear change operation to obtain economical running is carried out with reference to the first gear change map data and the operation moves to step 24. In step 24, on the basis of the calculated result in step 23 and the position signal U5, it is discriminated whether or not the gear change operation is necessary at that time. When the decision in step 24 is YES, the program moves to step 25 where the gear change operation is carried out in accordance with the result of the calculation in step 23. When the decision in step 24 is NO, the program is returned to step 21.

When the decision in step 22 is NO, in other words, when the position $P_{OL}$ is "3", "4" or "5", the operation moves to step 26 where a calculation for gear change operation to obtain high-output-power running is carried out with reference to the second gear change map data.

Figure 5:
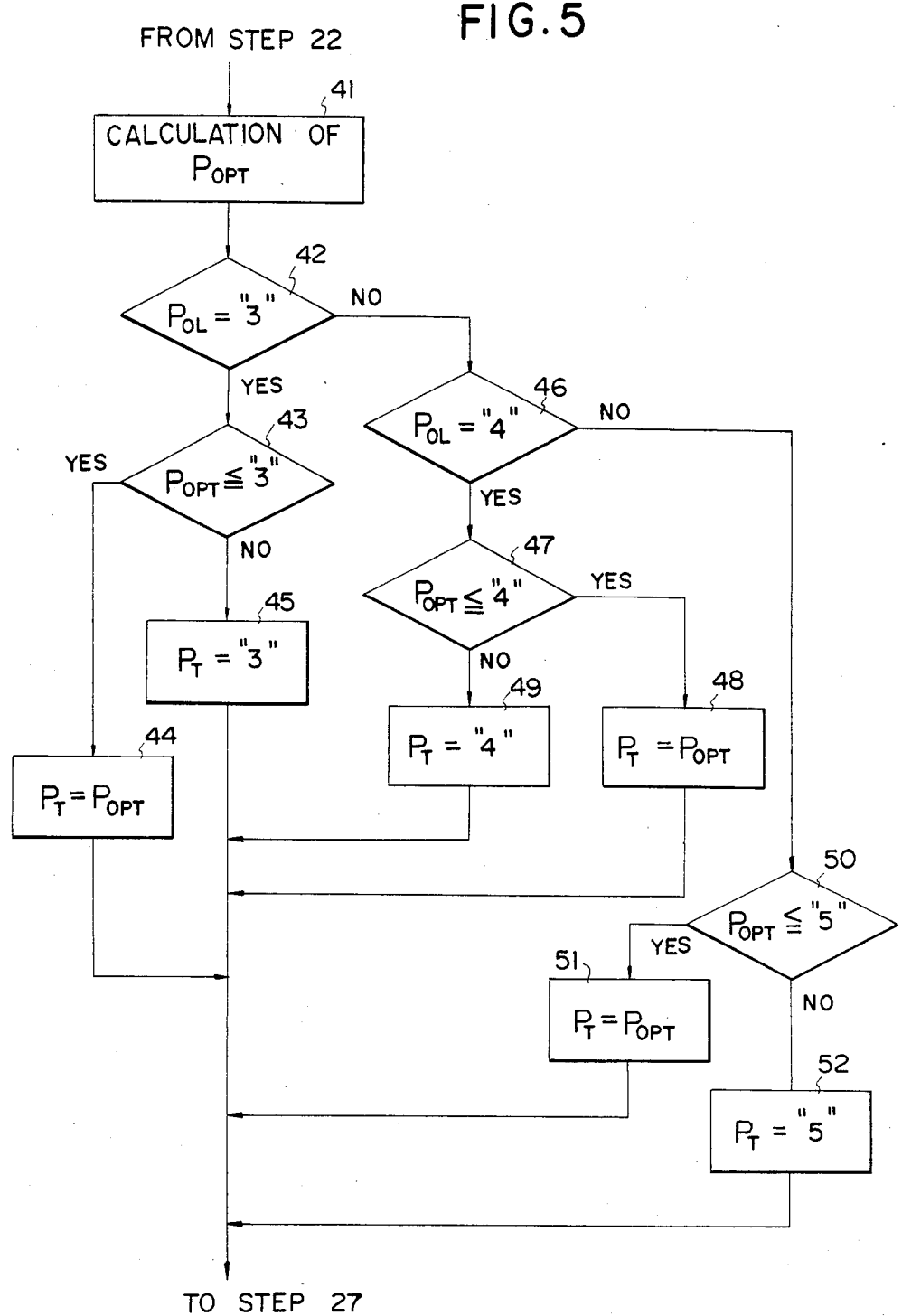
FIG. 5 is a detailed flow chart of one part of the flow chart shown in FIG. 4.

A detailed flow chart of the step 26 is shown in FIG. 5. At first, the optimum gear position $P_{OPT}$ for the transmission 5 is calculated in step 41 on the basis of the second gear change map data in response to the second speed signal U2 and the accelerator signal U3, and then the operation moves to step 42 where discrimination is made as to whether the position $P_{OL}$ is at "3". When the decision in step 42 is YES, the operation moves to step 43 where the discrimination is made as to whether the optimum position $P_{OPT}$ is "1", "2" or "3". When the decision in step 43 is YES, the operation moves to step 44 where the target or preset gear position $P_T$ is set at the position $P_{OPT}$ and the operation moves to step 27 (see FIG. 4). When the result of the discrimination in step 43 is NO, step 45 is executed to replace the preset position $P_T$ with "3", and the operation moves to step 27.

When the decision in step 42 is NO, the program moves to step 46 where discrimination is made as to whether the position $P_{OL}$ is at "4". When the decision in step 45 is YES, the operation moves to step 47 where the discrimination is made as to whether the optimum position $P_{OPT}$ is "1", "2", "3" or "4". When the result of the discrimination in step 47 is YES, the operation moves to step 48 where the preset gear position $P_T$ is set at the position $P_{OPT}$ and the operation moves to step 27. When the result of the discrimination in step 47 is NO, the operation moves to step 49 where the position $P_T$ is set at "4" and the operation moves to step 27.

When the decision in step 46 is NO, it is discriminated in step 50 whether the position $P_{OPT}$ is at "1", "2", "3", "4" or "5". When the result in step 50 is YES, the operation moves to step 51 where the optimum position $P_{OPT}$ is put into the preset position $P_T$ and the operation moves to step 27. When the decision in step 50 is NO, step 52 is executed and the preset position $P_T$ is set at "5". Then, the operation moves to step 27.

Returning to FIG. 4, in step 27, as in step 24, on the basis of the calculated result in step 26 and the position signal U5, it is discriminated whether or not the gear change operation is necessary at that time. When the decision in step 27 is YES, the program moves to step 25, while the program is returned to step 21 when the decision in step 27 is NO.

When the decision in step 21 is YES, discrimination is made in step 28 as to whether the position $P_{OL}$ at that time is coincident with the present gear position GP in the transmission 5. When the decision in step 28 is YES, the position GP is replaced with the preset position $P_T$ in step 29 and the operation returns to step 21. In this case, the gear change operation is not carried out. When the decision in step 28 is NO, the operation moves to step 30 where a decision is made as to whether or not the position $P_{OL}$ is able to assume the preset position $P_T$. That is, it is discriminated whether or not the engine speed N has become excessively high because of the shift-down operation. When the decision in step 30 is NO, the closest gear position to the position $P_{OL}$ to which the gear shift operation is permitted is set as the preset gear position $P_T$ in step 31. Then, the operation moves to step 25 where the gear position GP is changed to the target position $P_T$ set in step 31. When the decision in step 30 is YES, the position $P_{OL}$ at that time is set as the preset position $P_T$ in step 32 and the operation moves to step 25.

That is, when the operation lever 16 is positioned at "R", "1" or "2", a decision is made as to whether gear change operation to the position $P_{OL}$ is possible. If possible, gear change operation is carried out to change the position GP to the position corresponding to the position $P_{OL}$. If impossible, the gear change operation is made in such a way that the position GP is changed to the closest gear to the position $P_{OL}$ to which gear change is permissible.

As shown in FIG. 1, the command signal generator 13 is constituted to resemble a conventional manual gear change device. Moreover, the command signal generator 13 has the positions "R", "1" and "2" which permit gear changing in a manner similar to the operation of a conventional manually operated gear change device, the position "D" for economical running, and the positions "3", "4" and "5" for high-output-power running among which the highest assumable gear position is not higher than the gear position corresponding to that of the operation lever 16. Therefore, the driver can carry out gear change operations with the same feeling as with a conventional manual gear change device. Moreover, since no switches whatever are necessary to perform the automatic gear change operation described above, an improvement in operational ease is realized.

For example, assume that the car is being driven with the operating lever 16 in position "D" and it is desired to shift down for passing. At this time if the operation lever 16 is moved to the position "3", for example, the transmission 5 will be shifted to second or third gear, giving the driver the same feeling as that when the shift lever of a conventional manual gear shift device is moved from a higher gear to third gear for passing.

As described above, the driver is able to shift up or down merely by operation of the operation lever 16, so he can easily reflect his intention in the vehicle operation. Moreover, driver fatigue can be reduced and driving safety enhanced.

I claim:

1. An automatic transmission system for vehicles having a friction clutch coupled to an internal combustion engine, a speed-change-gear type transmission coupled to said clutch, a first actuator for operating said clutch in response to an electric signal, a second actuator for operating said transmission in response to an electric signal, means for producing at least one condition data indicative of the condition of operation of the vehicle and a control means responsive to at least said condition data for controlling the operation of said first and second actuators in order to carry out the gear change operation of said transmission, wherein said control means includes: (1) a storing means for storing a first data representing a first gear change map showing gear change characteristics for obtaining economical running and a second data representing a second gear change map showing gear change characteristics for obtaining high-power-output running; (2) a signal generating means which has an operation lever movable along a predetermined gear shift pattern used for manual operation and generates a command signal indicative of the position of the operation lever on the gear shift pattern; and (3) means responsive to said command signal and said condition data for controlling said first and second actuators so as to carry out a gear change operation in one mode among a first control mode in which said transmission is shifted to the gear position corresponding to the position of the operation lever, a second control mode in which said transmission is automatically shifted in accordance with the first gear change map and a third control mode in which said transmission is automatically shifted in accordance with the second gear change map.

2. A system as claimed in claim 1 wherein the control mode is decided in response to the position of the operation lever.

3. A system as claimed in claim 2 wherein in the third control mode the gear change operation is carried out in such a way that the highest gear position assumable by said transmission is that corresponding to the position of the operation lever.

4. A system as claimed in claim 3 wherein said signal generating means has at least a reverse position, a first range of gear positions, and a second range of gear positions, said transmission is shifted to reverse position in accordance with the first control mode when the operation lever is in the reverse position, said transmission is automatically shifted in accordance with the second control mode when the operation lever is in a gear position in the first range and said transmission is automatically shifted to a gear position not higher than the highest gear position assumable by said transmission in accordance with the third control mode when the operation lever is in a gear position in the second range.

5. A system as claimed in claim 4 wherein said signal generating means further comprises a first gear position and a second gear position and the transmission is shifted to the first or second gear position in accordance with the first control mode when the operation lever is in the first or second gear position.

6. A system as claimed in claim 4 wherein the second range of gear positions of said signal generating means comprises third, fourth and fifth gear positions and said transmission is shifted in accordance with the third control mode when the operation lever is in the third, fourth or fifth gear position.

7. A system as claimed in claim 5 wherein the second range of gear positions of said signal generating means comprises third, fourth and fifth gear positions and said transmission is shifted in accordance with the third control mode when the operation lever is in the third, fourth or fifth gear position.

* * * * *